United States Patent
Wehling et al.

(10) Patent No.: US 6,227,829 B1
(45) Date of Patent: May 8, 2001

(54) ECCENTRIC SCREW PUMP

(75) Inventors: Werner Wehling, Dorsten; Alfred Paul, Schermbeck, both of (DE)

(73) Assignee: Allweiler AG (DE)

( * ) Notice: Subject to any disclaimer, the term of this patent is extended or adjusted under 35 U.S.C. 154(b) by 0 days.

(21) Appl. No.: 09/299,496

(22) Filed: Apr. 26, 1999

(30) Foreign Application Priority Data

Apr. 27, 1998 (DE) .............................. 198 18 676
Jun. 4, 1998 (DE) .............................. 198 24 848

(51) Int. Cl.[7] .................................................. F01C 1/10
(52) U.S. Cl. ........................ 418/48; 403/370; 403/368; 403/374.4
(58) Field of Search .............................. 418/48; 403/370, 403/368, 374.4

(56) References Cited

U.S. PATENT DOCUMENTS

| | | | | |
|---|---|---|---|---|
| 2,028,407 | * | 1/1936 | Moineau | 418/48 |
| 3,957,381 | * | 5/1976 | Schafer | 403/374.4 |
| 4,268,185 | * | 5/1981 | Mullenberg | 403/370 |
| 4,471,846 | * | 9/1984 | Mullenberg | 403/370 |
| 5,639,176 | * | 6/1997 | Mullenberg | 403/370 |

FOREIGN PATENT DOCUMENTS

| | | | | |
|---|---|---|---|---|
| 3410306 | * | 12/1984 | (DE) | 418/48 |
| 400508 | * | 10/1933 | (GB) | 418/48 |
| 622583 | * | 5/1949 | (GB) | 418/48 |
| 2163522 | * | 2/1986 | (GB) | 403/370 |
| 2244518 | * | 12/1991 | (GB) | 418/48 |
| 59-224489 | * | 12/1984 | (JP) | 418/48 |

* cited by examiner

Primary Examiner—Thomas Denion
Assistant Examiner—Theresa Trieu
(74) Attorney, Agent, or Firm—Bachman & LaPointe, P.C.

(57) ABSTRACT

In an eccentric screw pump having a pump shaft which at one end is in the form of a hollow shaft mounted near a joint head or the like connecting portion and connected thereto, and which is fitted on to the output shaft of a pump drive and is connected thereto, the pump shaft and the output shaft are connected by a force-locking connection. There is also provided a clamping device which produces radial forces and which embraces the drive end of the pump shaft, said end being in the form of a hollow shaft. The clamping device is arranged near the end edge of the cylinder wall at a first support portion.

14 Claims, 2 Drawing Sheets

ECCENTRIC SCREW PUMP

BACKGROUND OF THE INVENTION

The invention concerns an eccentric screw pump having a pump shaft which at one end is in the form of a hollow shaft mounted near a joint head or the like connecting portion and connected thereto, and which is fitted on to the output shaft of a pump drive and is connected thereto.

The applicants DE 41 21 717 discloses an eccentric screw pump of that kind. Its pump connection shaft which is hollow towards its end is pushed on to the output shaft and connected thereto in positively locking relationship by a grooved dowel pin which crosses the shaft axis. The direct connection of the output shaft of the pump drive to the drive shaft of the pump, which is fitted on to same, can also be effected by spline connections.

For assembly and dismantling reasons those connections involve play and are protected from corrosion by additional sealing elements. In spite of that sealing effect and the use of anti-corrosion agents between the components it is not possible to exclude corrosion, in particular frictional or fretting corrosion or tribocorrosion.

In addition, by virtue of their design configuration, as a result of stress concentrations or notch effects which occur, those connections require large outside diameters for the pump shaft, with the consequence that they necessitate in particular shaft sealing components of greater size, in comparison with a pump without a push-on shaft connection, and that gives rise to an increased level of susceptibility on the part of such components.

SUMMARY OF THE INVENTION

In consideration of that state of the art the inventor set himself the aim, while retaining ease of assembly and dismantling, of avoiding the above-mentioned shaft play, corrosion and/or Lribocorrosion, as well as large outside pump shaft diameters and larger shaft sealing components.

That object is attained by the teaching set forth herein.

In accordance with the invention the output shaft is connected by a force-locking connection to the pump shaft which embraces it in the coupling region. For that purpose the pump shaft is at least partially in the form of a thin-walled hollow shaft without a notch-effect or stress-concentration transverse bore or spline or key groove and in accordance with a further feature of the invention it is clamped by a clamping device which produces radial forces and which is applied from the exterior on to the output shaft of the drive. With that arrangement torque and axial force transmission are effected by frictional engagement.

By virtue of those features the push-on shaft connection is radially and axially play-free and does not allow any relative movements. In addition this play-free, force-locking connection is pressure-tight. Corrosion and/or frictional or fretting corrosion are reliably prevented.

A further advantage that is to be seen therein is that the notch-free structure permits high loadings and thus small shaft diameters. As a result the outside diameter of the pump shaft is identical to those of existing pumps with continuous supported pump shaft and drive by way of a coupling means; in particular there is no need for relatively large shaft sealing components. When the clamping connection is released the hollow shaft springs open, which ensures easy dismantle-ability.

Advantageously the ratio of the wall thickness of the cylinder wall of the hollow shaft end to the shaft diameter is between 1:7 and 1:15, preferably being about 1:10.

In accordance with the invention the clamping device embraces the drive end of the pump shaft in the form of a hollow shaft, near the end edge of the cylinder wall in the region of a first bearing or support portion of a coupling end of the output shaft, It has proven to be advantageous for the clamping device to have a clamping ring embracing the pump shaft, with an outside surface which is inclined at an angle towards the drive in relation to the longitudinal axis of the shaft, for an outside ring with a correspondingly inclined inside surface, and pulling or tension elements which are parallel to the axis and with which the clamping ring and the outside ring are displaceable towards each other in the axial direction; the outside ring is pulled towards the joint head into its clamping position.

In accordance with the invention the clamping ring is of an L-shaped configuration in cross-section and involves a pressure limb which bears at the inside against the pump shaft and on the other hand has the inclined outside surface, and a radial collar, wherein passing through the latter are clamping screws as the tension elements, which engage into the outside ring. The latter can be pulled towards the joint head by the clamping screws, whereby the radial pressure on the support portion embraced by the hollow end of the pump shaft increases.

Flexural moments—in particular increased flexural moments in the event of joint wear and thus increased loadings in relation to the hollow shaft and the clamping connection—are counteracted in accordance with the invention by the arrangement of a second bearing or support location between the joint engagement point and the clamping location or the first support portion.

To prevent tribocorrosion, an—annular—gap is advantageously arranged in the region between the two support locations or portions, the gap being delimited on the inward side by an intermediate portion of the coupling end and outwardly by the wall of the hollow end of the pump shaft.

BRIEF DESCRIPTION OF THE DRAWINGS

Further advantages, features and details of the invention will be apparent from the following description of a preferred embodiment and with reference to the drawing in which.

DETAILED DESCRIPTION OF THE PREFERRED EMBODIMENT

Figure 1:
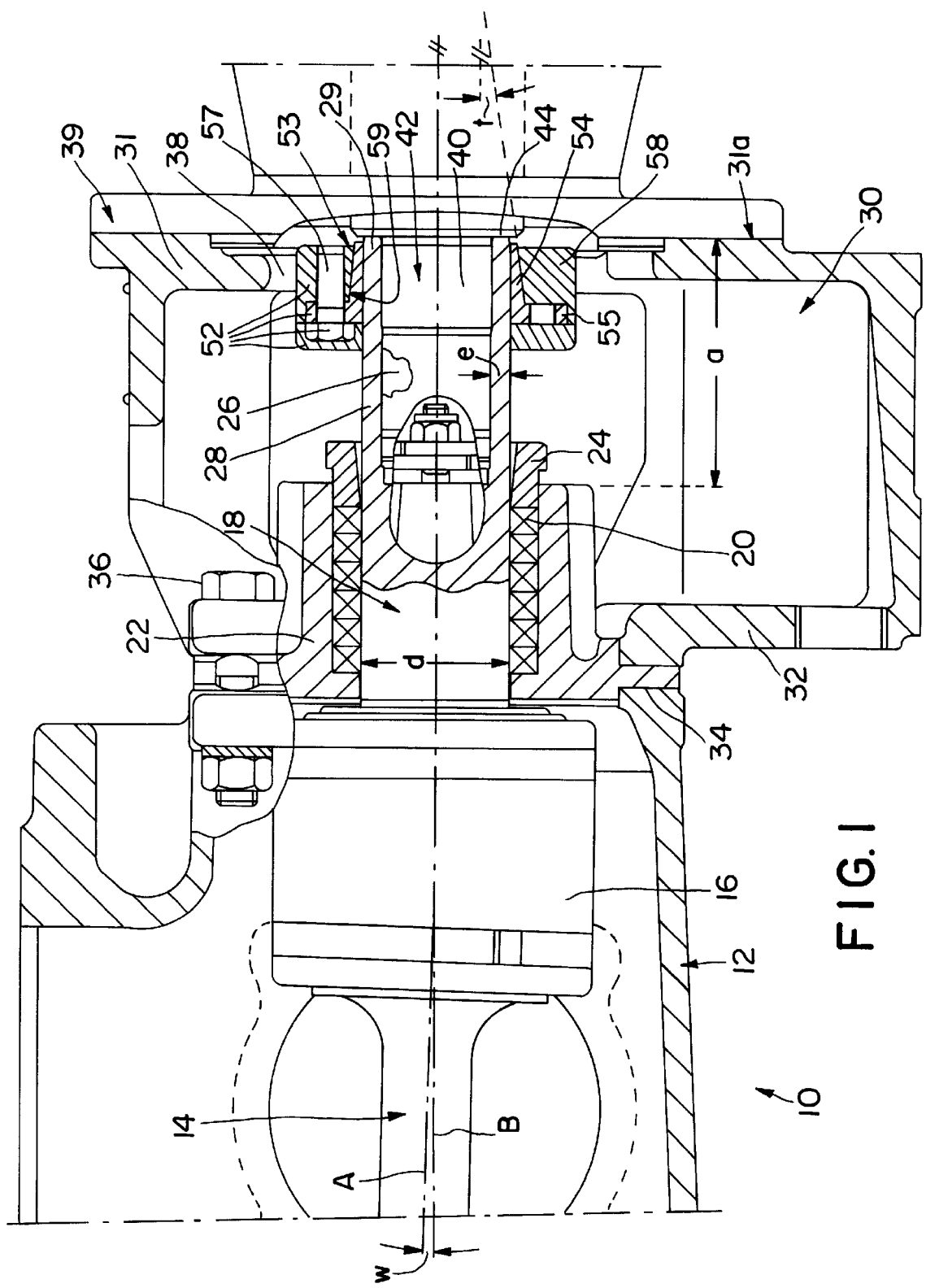
FIG. 1 is a view partly in longitudinal section through an eccentric screw pump.
Figure 2:
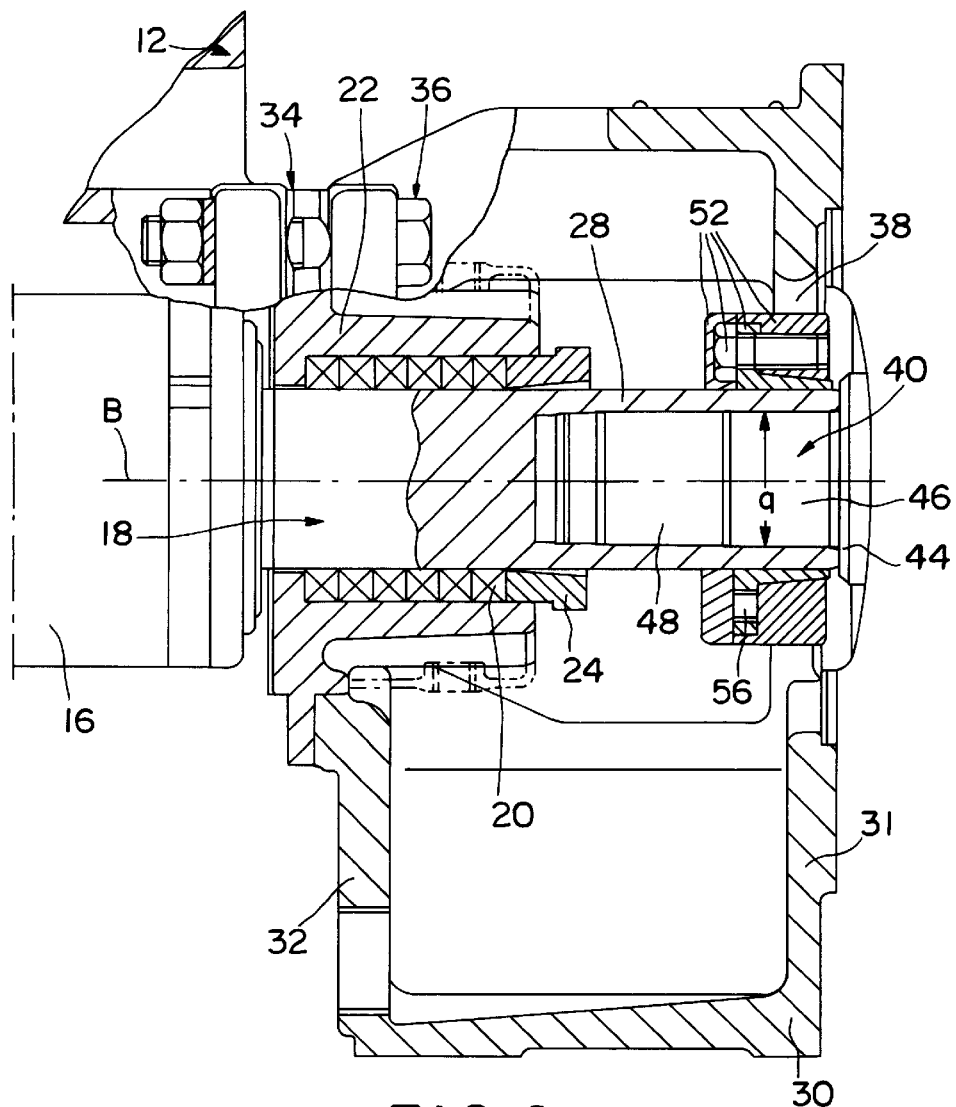
FIG. 2 shows a detail on an enlarged scale from FIG. 1.

An eccentric screw pump 10 has in a shaft housing 12 a universal-joint shaft 14 with a joint head 16, the other end (not shown) of the shaft 14 being mounted to a rotor of spindle-like configuration. Extending from the joint head 16 is a pump push-in shaft 18 of a diameter d, which near the joint head 16 is surrounded by packing rings 20, a gland housing 22 and a gland member 24.

In relation to the position of the pivotal mounting point, said position being eccentric relative to the longitudinal axis of the spindle-like rotor, the longitudinal axis A of the shaft 14 extends at an angle w relative to the longitudinal axis B of the pump shaft 18 whose shaft end at the drive side is in the form of a hollow shaft with a cylinder wall 28 which is comparatively thin, defining a shaft cavity 26 of a length a:

the shaft diameter d corresponds approximately to 7 to 15 times the dimension of the wall thickness e.

The pump shaft 18 is surrounded by a cup-like housing 30, a so-called cage support, which is screwed by an end wall 32 to the shaft housing 12 at 36, with the interposition of a seal 34.

The end edge 29 of the cylinder wall 28 engages through a central opening 38 in a cover wall 31 of the housing 30 and is approximately aligned with the outside surface 31a thereof. Indicated at 39 is a connecting plate of a drive housing which is otherwise not shown in the drawing, with the output shaft 42 extending through the connecting plate 39.

Figure 3:
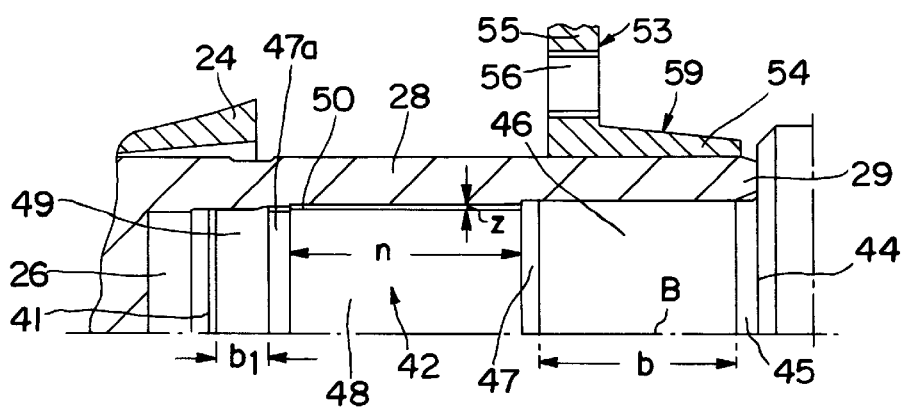
FIG. 3 shows a portion on an enlarged scale from FIG. 2.

The coupling end 40 of an output shaft 42 of a pump drive (not shown) is inserted into the shaft cavity 26 in such a way that an outer annular shoulder 44 of the output shaft 42 butts against the end edge 29 of the pump shaft 18. Adjoining that annular shoulder 44—after an annular groove 45 which can be seen in FIG. 3—is a first bearing or support portion 46 of the output shaft 42, the axial length of which is identified by b and the diameter of which is identified by q and which terminates at an inner annular shoulder 47. The inner annular shoulder 47 is followed towards the end 41 of the coupling end 40 or the output shaft 42 by an intermediate portion 48 of an axial length n which is followed—after a further annular shoulder 47a—by a second bearing or support portion 49 of a length b1. The intermediate portion 48 with the cylinder wall 28 which extends around it at a radial spacing z defines a gap 50 of an axial length n, which is shown on an increased scale in FIG. 3, In addition the cylinder wall 28 is matched to the radial step configurations of the coupling end 40 and bears directly against same in the region of the two bearing or support portions 46, 49.

The coupling end 40 which is in the form of a solid profile portion is connected in force-locking relationship to the hollow end of the pump shaft 18; near the end edge 29 the cylinder wall 28 carries a clamping device 52 with a clamping ring 53 of L-shaped cross-sectlon; a radial collar 55 projects from a pressure limb 54 of the clamping ring 53, the pressure limb 54 tapering in cross-section towards the end edge 29 of the pump shaft 18. The radial collar 55 is provided with bores 56. Clamping screws 57 pass therethrough and pull an outside ring 58 having an inside surface which is inclined relative to the longitudinal axis 8 at an angle t of about $7^D$ and which slides against the equally inclined outside surface 59 of the pressure limb 54. In that situation, the cylinder wall 28 is increasingly pressed-in force-locking relationship—against the coupling end 40 of the output shaft 42.

The system comprising the pump push-in shaft 18 and the inserted coupling end 40 therefore affords between the joint head 16 and the region of the clamping device 52 or the first support portion 46 a second bearing or support portion 49 of shorter axial length b1 and—to prevent tribocorrosion—the gap 50 between the two portions 46, 49. The ratio of the lengths b1 to b is here about 1:4. The length n of the gap 50 is somewhat larger than the length b of the first support portion 46.

What is claimed is:

1. An eccentric screw pump, which comprises: a pump shaft which at one end is in the form of a hollow shaft mounted near a joint head connecting portion and connected thereto, and which is fitted on the output shaft of a pump drive and is connected thereto; wherein the pump shaft and the output shaft are connected by a clamping device which produces radial forces and which embraces the drive end of the pump shaft by a force-locking connection at a distance from the joint head, said drive end being in the form of a hollow shaft; and wherein the clamping device has a clamping ring embracing the pump shaft with an outside surface which is inclined relative to the longitudinal axis (B) of the shaft at an angle (t) for an outside ring with a correspondingly inclined inside surface.

2. An eccentric screw pump as set forth in claim 1, including a ratio of the wall thickness (e) of the wall of the hollow shaft end to the shaft diameter (d) of the pump shaft of 1:7 to 1:15.

3. An eccentric screw pump as set forth in claim 2, wherein said ratio is 1:7 to 1:10.

4. An eccentric screw pump as set forth in claim 1, wherein the clamping device is arranged near an end edge of the wall of the hollow shaft end at a first support portion.

5. An eccentric screw pump as set forth in claim 4, including a second support portion arranged between one of the clamping device and the first support portion for the coupling end of the outside shaft in the pump shaft and the joint head.

6. An eccentric screw pump as set forth in claim 5, wherein extending between the two support portions is a gap which is of annular configuration and is delimited by an intermediate portion of the coupling end of the output shaft on the one hand and the oppositely disposed portion of the wall of the hollow shaft end of the pump shaft on the other hand.

7. An eccentric screw pump as set forth in claim 6, wherein the axial length (b) of the first support portion approximately corresponds to the axial length (n) of the gap.

8. An eccentric screw pump as set forth in claim 6, wherein the axial length (b) of the first support portion is somewhat shorter than the axial length (n) of the gap.

9. An eccentric screw pump as set forth in claim 5, wherein the second support portion is shorter than the first support portion.

10. An eccentric screw pump as set forth in claim 9, wherein the ratio of lengths of the second support portion to the first support portion is 1:4.

11. An eccentric screw pump as set forth in claim 1, wherein the clamping ring embracing the pump shaft has an outside surface which is inclined towards the drive relative to the longitudinal axis (B) of the shaft and wherein the clamping device has tension elements parallel to the axis, with which the clamping ring and the outside ring are displaceable towards each other in the axial direction.

12. An eccentric screw pump as set forth in claim 11, including an angle (t) of between about 5° and 10°.

13. An eccentric screw pump as set forth in claim 11, wherein the outside ring can be moved into its clamping position in a direction towards the joint head.

14. An eccentric screw pump as set forth in claim 11, wherein the clamping ring of the clamping device is of an L-shaped configuration in cross-section with a pressure limb which bears against the pump shaft and which has an inclined outside surface, and with a radial collar thereof, and including clamping screws passing through the radial collar as tension elements which engage into the outside ring.

* * * * *